March 17, 1953    R. J. WYNNE    2,631,378
INTERNAL GAUGE
Filed Aug. 12, 1947

Inventor
Robert John Wynne
By Harry C. Schroeder
Attorney

Patented Mar. 17, 1953

2,631,378

UNITED STATES PATENT OFFICE 2,631,378

INTERNAL GAUGE

Robert John Wynne, Oakland, Calif.

Application August 12, 1947, Serial No. 768,195

3 Claims. (Cl. 33—178)

This invention relates to machinists' precision tools, and more particularly to internal gauges, and has for its principal object the provision of a device of the class described, especially adapted to the accurate measurement of internal diameters of either parallel or tapered bores.

A further object of the invention is the provision of a gauge that can be pre-set to a desired standard, so that any departure therefrom can be accurately and quickly determined.

A still further object of the invention is the provision of an internal gauge, having an adjustable stop, whereby the user is enabled to check the bore of a hole at selected points along its axis, and thus determine the amount of taper that may exist per unit of length.

These and other objects will become apparent during the course of the following description, taken in connection with the accompanying drawing, forming a part hereof, and in which.

Figure 1:
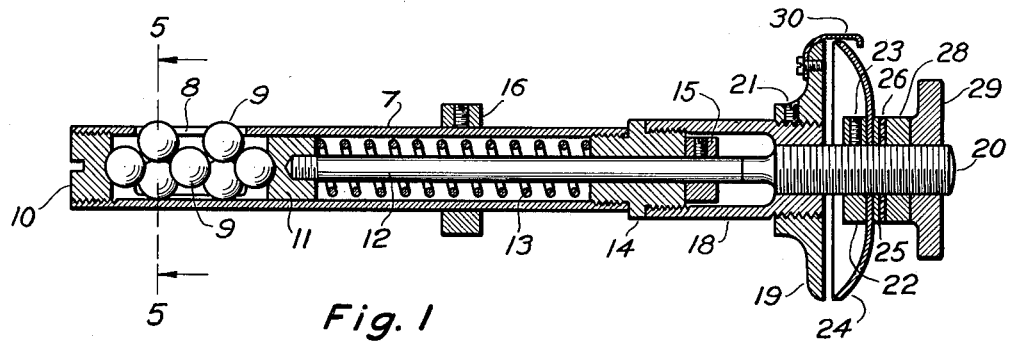
Figure 1 is a longitudinal cross section through the center line of an embodiment of the invention.

Referring to the drawing in detail, a parallel tube 7 is shown having an internal thread extending inwardly, a relatively short distance, at either end. Adjacent one end thereof, three parallel slots 8 are cut through the wall of the tube 7, and are equally spaced around the circumference. The slots 8 are of such a length as to permit the installation of nine steel balls 9 into the inside of the tube 7, and are of such a width as to prevent their lateral displacement therefrom, while still allowing a limited movement in that direction.

Figure 5:
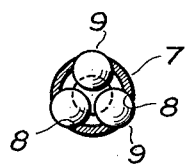
Figure 5 is a section taken on line 5—5 of Figure 1.

As can be seen on Figures 1 and 5, the balls 9 are arranged in the following order, a single ball coincident with the center line of the device, a cluster of three balls contiguous with the first one, each being aligned with a slot 8, and being coplanar with one another, a second single ball symmetrical to the first one relative to a plane coincident with the centers of the three balls, a second cluster of three balls arranged in identical relationship to the second single ball as the first cluster is to the first single ball, and a third single ball symmetrical with the first single ball relative to the entire group.

The balls 9 are held in place in the end of the tube 7 by a threaded plug 10 screwed in the end thereof. The plug 10 is preferably formed with a centrally located depression on the inner end thereof, complementary to the contour of the contiguous ball 9. The balls 9 are yieldingly restrained from longitudinal motion in the other direction by the combination of a rod guide 11, a rod 12, a compression spring 13 and an adapter fitting 14. The guide 11, which is adapted to slide freely but not loosely in the interior of the tube 7, is formed with a ball engaging depression similar to that of plug 10, and on its opposite end is provided with a centrally located tapped hole which engages the threaded end of the rod 12. If desired, the guide 11 and the rod 12 can be formed integral with one another.

The adapter fitting 14 is formed of two concentric threaded portions, separated by a flange or collar, and having a centrally located bore adapted to permit sliding motion of the rod 12 therein. As can be clearly seen on Figure 1, after the balls 9 and the plug 10 have been installed, the guide 11 and attached rod 12 are inserted with the spring 13 surrounding the rod 12. The fitting 14 is then mounted on the rod 12 and screwed into the tube 7, thus holding the assembly together. A stop collar 15 is mounted on the protruding end of the rod 12, in order to relieve the balls 9 of the pressure exerted by the spring 13.

It will be apparent that any movement of the balls 9 in the slots 8, toward the center of the tube 7, will cause an increase in the center distance of the extreme balls, and consequent movement of the rod 12. Therefore, as the gauge is passed through a machined hole, any variation in the longitudinal position of the rod 12 will be indicative of a variation in the diameter of the hole. Outward movement of the rod 12 is caused by the cam action of the balls being pressed inwardly, and motion of the rod 12 in the opposite direction is caused by the pressure of the spring which acts to spread the balls outwardly upon any increase in diameter of the hole being measured.

For use in the measurement of tapered holes, or the checking of diameters at selected depths, a collar 16 is adjustably mounted on the outside of the tube 7, and is adapted to register with graduations 17 marked on the tube.

In the embodiment of the invention shown on Figure 1, an adapter sleeve 18 engages the protruding threaded end of the fitting 14, and houses stop collar 15 and the protruding end of rod 12. The remote end of the sleeve 18 is threaded externally to engage a flange 19, and is threaded internally to receive an adjusting screw 20. The flange 19 is fixedly mounted on the sleeve 18, and is locked in place thereon by a set screw 21. If desired the flange can be made an integral part of the sleeve 18.

Figure 4:
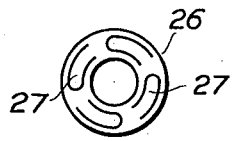
Figure 4 is an elevation of a spring washer used in the device.

The adjusting screw 20, which has a single lead of 40 pitch, is reduced at its inner end, and is ground square to accurately match the engaging end of the rod 12. A dial nut 22 is locked in place on the screw 20 by means of a set screw 23, and is adapted to form a shoulder against which a dial 24 is rotatably mounted on the screw 20. The dial 24 comprises a dished disc having its periphery of the same diameter as, and adjacent to, the periphery of the flange 19, and being graduated on the outside to form twenty-five equal divisions. A washer 25 contacts the outer side of the dial 24, and it in turn is contacted by a spring washer 26. The spring washer 26 is formed with laterally displaced tongue portions 27, as shown on Figure 4, which are adapted to exert a pressure against any contacting surface. A lock nut 28, mounted on screw 20, contacts the spring washer 26 on one side, and on the outer side bears against an adjusting screw hand nut 29.

Dial nut 22 is locked in place on the screw 20, and then dial 24, washers 25 and 26 are mounted in the order named. The lock nut 28 is then screwed down until the required amount of compression is exerted by washer 26 to prevent dial 24 from turning too freely on the screw 20, and the hand nut 29 then contacts, and is locked in place by, the lock nut 28.

A pointer 30 is attached to the flange 19 and is adapted to register with the graduations of the dial 24. It will be obvious that rotation of the screw 20 an amount necessary to move the dial through an angle corresponding to one space, will cause it to advance or retract one one-thousandth part of an inch, as the product of one twenty-fifth and one fortieth is one thousandth.

In use, a standard ring gauge of sufficient length is placed over the two clusters of balls 9, and screw 20 is advanced until the balls contact the gauge. The dial is then revolved upon the screw until the zero mark registers with the pointer. The zero setting now represents a standard. By retracting the adjusting screw, inserting the gauge into a bore to be checked, and then advancing the screw the amount necessary to cause the balls to again make contact, any deviation from the standard setting of the device will be apparent from the relative positions of dial and pointer.

Figure 2:
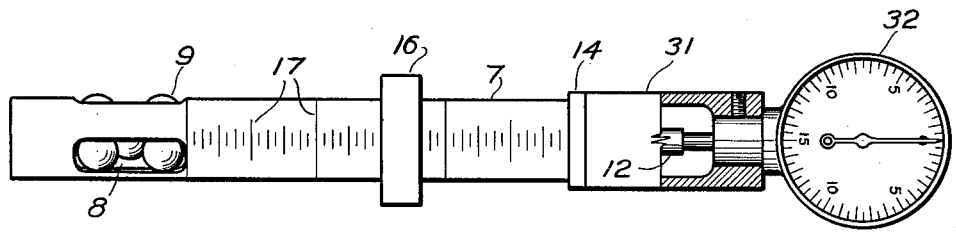
Figure 2 is an elevation, partly in section, of the device shown on Figure 1, the adjusting head being removed and being replaced by an indicator dial.
Figure 3:
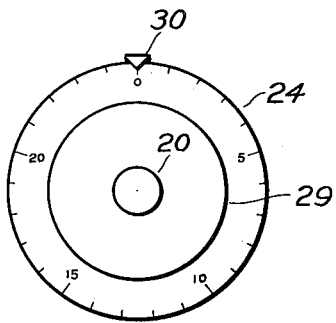
Figure 3 is an end elevation showing the adjusting head.

In the embodiment shown on Figure 2, an adapter sleeve 31 is provided to carry a dial indicator 32, mounted as shown to indicate movement of the rod 12 with which it is in contact.

If desired, the adapter sleeves 18 and 31 may be provided with holes or openings for the purpose of observing the contact of the adjusting screw or the dial indicator, respectively, with the rod 12.

While I have disclosed a preferred embodiment of my device, various modifications may be made, such as the elimination of a single ball and its contiguous cluster, or the device could even be designed to function with one cluster of balls contacting the stop 10 and a single centrally located ball contacting the guide 11; I therefore, do not wish to be limited by the specific embodiment illustrated, but only to the extent embraced by the spirit and scope of the appended claims.

I claim:

1. An internal gauge comprising a cylindrical body, said body having a plurality of longitudinal slots at one end thereof, a plurality of balls contained in said body, said balls being arranged in a plurality of rows of three balls in each row and having a single ball between said rows contacting the balls of each of the adjoining rows, the balls of the rows partially projecting through said slots and adapted to contact the wall of a bore to be measured and to be pushed inwardly by said wall, a sliding member resting on at least one of said balls and adapted to be moved by cumulative displacement of said balls, means on said sliding member for creating resilient pressure on said balls, means for limiting the movement of said sliding member toward said balls; and an indicating means associated with said sliding means for reading the size of the bore.

2. An internal gauge comprising a hollow cylindrical body having a plurality of longitudinal slots at one end thereof; a plurality of balls in said body with each of the balls loosely contacting at least one other ball, some of the balls partially projecting through each of said slots, a sliding member inside of said body one end of which rests on at least one of said balls, means for yieldingly forcing said sliding member against at least one of said balls; means for limiting the movement of the sliding member toward said balls and an indicating means associated with said sliding means for reading the size of the bore which is measured.

3. An internal gauge comprising a hollow cylindrical body having a plurality of longitudinal slots at one end thereof; a plurality of balls arranged in layers so that at least one ball in each of said layers partially projects through one of the slots, said layers being separated by single balls, said balls projecting through said slots being adapted to contact the wall of a bore to be measured and to be pushed inwardly thereby; a sliding member in said body, one end of which rests on at least one of the balls, means for yieldingly forcing said sliding member against said ball, means for limiting the motion of the sliding member toward said balls; an indicator attached to the body, an adjustable dial adapted to be set at any standard position, and means associated with said sliding member for measuring the deviations from said standard position.

ROBERT JOHN WYNNE.

REFERENCES CITED

The following references are of record in the file of this patent:

UNITED STATES PATENTS

| Number | Name | Date |
|---|---|---|
| 484,813 | Nugent | Oct. 25, 1892 |
| 1,048,073 | Hirth | Dec. 24, 1912 |
| 1,420,951 | Bartholdy | June 27, 1922 |
| 1,423,542 | Rockwell | July 25, 1922 |
| 1,644,535 | Bartholdy | Apr. 3, 1928 |
| 2,047,607 | Zimmerman | July 14, 1936 |
| 2,232,340 | Olson | Feb. 18, 1941 |
| 2,312,222 | Tanner | Feb. 23, 1943 |
| 2,348,643 | Poole | May 9, 1944 |

FOREIGN PATENTS

| Number | Country | Date |
|---|---|---|
| 218,397 | Switzerland | Apr. 16, 1942 |
| 227,618 | Switzerland | Sept. 1, 1943 |
| 230,931 | Switzerland | May 1, 1944 |
| 376,052 | Germany | May 23, 1923 |